No. 661,024. Patented Oct. 30, 1900.
D. C. RIPLEY & F. L. O. WADSWORTH.
APPARATUS FOR MAKING GLASS.
(Application filed Jan. 27, 1900.)
(No Model.) 2 Sheets—Sheet 1.
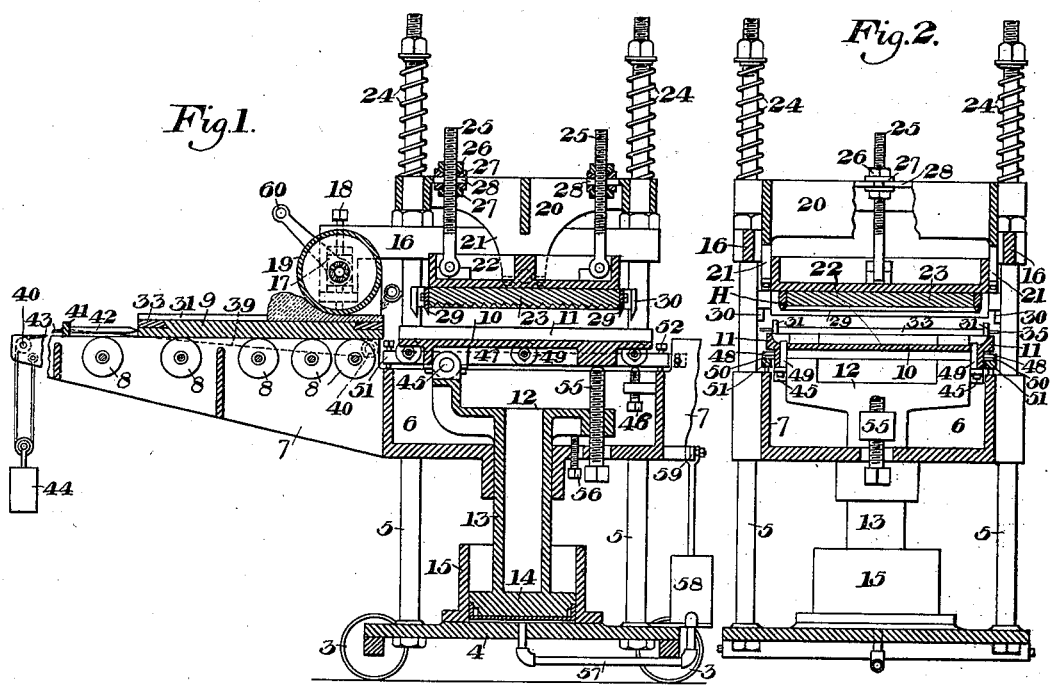
WITNESSES
INVENTORS No. 661,024. Patented Oct. 30, 1900.
D. C. RIPLEY & F. L. O. WADSWORTH.
APPARATUS FOR MAKING GLASS.
(Application filed Jan. 27, 1900.)
(No Model.) 2 Sheets—Sheet 2.
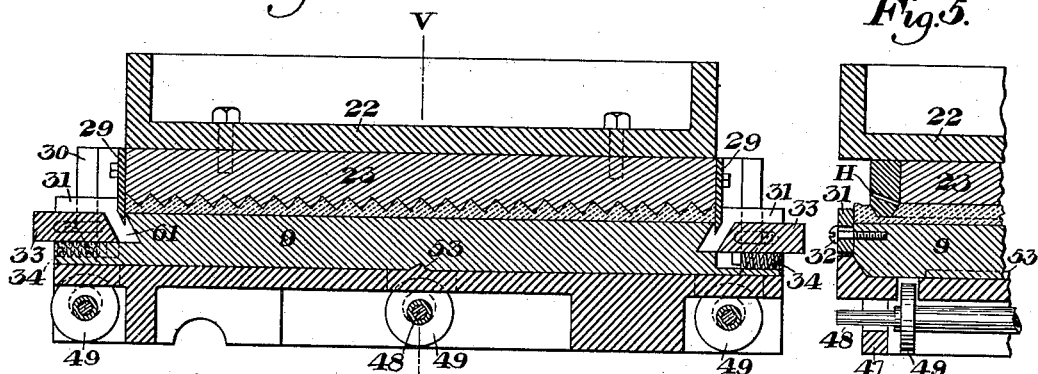

UNITED STATES PATENT OFFICE.

DANIEL C. RIPLEY, OF PITTSBURG, AND FRANK L. O. WADSWORTH, OF ALLEGHENY, PENNSYLVANIA, ASSIGNORS TO WILLIAM A. BOND, TRUSTEE, OF CHICAGO, ILLINOIS.

APPARATUS FOR MAKING GLASS.

SPECIFICATION forming part of Letters Patent No. 661,024, dated October 30, 1900.

Application filed January 27, 1900. Serial No. 3,029. (No model.)

*To all whom it may concern:*

Be it known that we, DANIEL C. RIPLEY, of Pittsburg, and FRANK L. O. WADSWORTH, of Allegheny, in the county of Allegheny and State of Pennsylvania, have invented a new and useful Improvement in Apparatus for Making Glass, of which the following is a full, clear, and exact description, reference being had to the accompanying drawings, forming part of this specification.

Our invention relates to an improvement in apparatus for the manufacture of prism-glass for illuminating purposes. Heretofore in the manufacture of such prism-glass it has been the most approved practice to press the prism-surfaces in molds in the same manner in which glass articles are ordinarily pressed, a gathering of glass being placed in the mold and the plunger being brought down upon it, so as to displace it and to cause it to flow into all portions of the mold-cavity and to assume the contour and configuration thereof. It has been found that in this method of manufacture it is not practicable to make prism plates or pieces of large size, and they generally have been made of not more than three or four inches square. The reason of this is the difficulty of causing the glass to flow in the mold while cool enough to prevent burning of the sharp projecting portions of the forming-surface of the latter. Moreover, owing to the means of manufacture employed the prism-plate when pressed, even of such small size, lacks strength and is apt to be broken. It cannot be cut with a diamond, for when the surface is scored by the cutting-tool it will crack and break upon irregular lines. These practical difficulties have limited the utility of such glass-prism surfaces, for making of the pieces in small sizes increases the difficulty of assembling them, and the frame in which they are assembled is expensive to make and is more or less unsightly and to some extent excludes the light. Attempts to make prism projections by making the prism-pattern on the sheet-forming roll or on the table of the rolling-machine have been unsatisfactory, so far as we are aware, on account of the difficulty in forming a deep prism-pattern by such operation. We have discovered that all these difficulties heretofore experienced can be avoided and glass-prism surfaces made by our improved apparatus in single pieces of large area without impaired strength and capable of being cut with a diamond or other cutting device either parallel with or at an angle to the line of the prisms. Thus instead of forming the glass as heretofore by a single operation of pressing in a mold or rolling on a table we employ a mechanism comprising in combination two main parts—namely, a rolling-table on which we first roll out the glass into a flat mass and a vertically-moving upper die which may be of the dimensions required for the glass sheet and is shaped on the under side to produce the required prism-pattern. While the flat mass of glass is still plastic this die is brought down upon the surface of the glass, displacing the glass upwardly into the crevices of the pattern, with every portion of which the material is forced into contact until formed to prismatic ridges of glass having sharp angles, finished faces, and clean-cut outlines. In order to produce finished surfaces, the die must be brought against the glass with sufficient pressure to force the glass into contact with the mold over the entire surface thereof. In other words, the glass must be forced against the whole surface of the pattern under pressure. This is illustrated in the drawings, which show our die at work on a sheet of glass. Every part of the pattern of the die makes actual pressing contact with the glass beneath, giving a sharp clearly-defined contour. This operation is distinguished from an operation wherein the glass is merely cut or pierced, and it produces two important results. First, inherent molecular straining of the glass is prevented, because in the preliminary spreading the glass is so hot and plastic that it flows freely, and in the forming of the prism-pattern by the die the glass is still plastic and there is only a slight up-and-down motion of the glass particles without substantial lateral spreading thereof, and, second, definitely-shaped and polished surfaces are secured by bringing the polished surfaces of the upper shaping-die forcibly into contact with the material of the glass over the entire cross-section of the portion which is being shaped.

Figure 1 is a longitudinal sectional elevation showing our improved apparatus. Fig. 2 is an end view, partly in section. Fig. 3 is a plan view, the die-plate being removed; Fig. 4, an enlarged longitudinal section through the dies; Fig. 5, a part transverse section on the line V V of Fig. 4; Fig. 6, an enlarged section of the central part of the apparatus, showing the dies elevated and inclined; Fig. 7, a part transverse section showing a modified form of die and table support. Fig. 8 is an enlarged partial sectional view of the die and table with an interposed glass sheet.

The machine consists of a main frame, preferably portable, and mounted, as shown, on wheels 3, on which it can be moved on suitable tracks in front of the annealing-oven. This main frame is built up of a base-plate 4, which supports four heavy steel columns 5, and of a heavy box-shaped casting 6, which is supported on these columns. At each end of the frame are heavy vertical plates 7, suitably cross-braced, and between them are mounted small rollers 8, on which a movable spreading-table or platen 9 rolls. In the center of the box-shaped casting between the four vertical columns just mentioned is a table 10, the top surface of which is on a level with the top surface of the rollers 8, and which has side flanges 11, the top surface and side flanges being so shaped as to receive the platen 9. This supporting-table 10 may be set to different angles, and to this end suitable adjuncts are used. For instance, the table is pivotally mounted on a carrier (shown as a tripod-head 12) which is moved vertically by suitable mechanism. As shown, the head is carried on a piston-rod 13, connected with the piston 14, moving in a cylinder 15, mounted on the base-plate 4.

Above the table 10 and also supported by the side columns are mounted two bars 16 16, the ends of which project forward over the front end of the machine and are slotted, as at 17, to receive boxes which are adjustable vertically with reference to the platen 9 by means of screws 18 and which form the bearings for the trunnions or shaft of a roller 19.

Above the bars 16 and sliding freely on the side column is a frame 20, having at opposite sides two hangers 21, in which are pivoted the trunnions of a die-plate 22, which serve as the support for the upper die 23 of the machine. The frame 20 by the action of springs 24 is held down against adjustable stops on the columns 5. To hold the upper die 23 in proper relative position to the frame 20, screw-eyebolts 25 25 are provided, which are pivoted at the lower ends to bosses on the die-plate 22 and are clamped at the upper screw ends to the frame 20 by means of nuts 26 and washers 27, engaging on opposite sides of the slotted lugs 28, projecting from the frame 20.

The upper die 23 is held to the die-plate 22 by means of bolts or set-screws and has at its sides two knife-edge cutters 29 29, projecting somewhat below the lower surfaces of the die, and also two projecting wedge-shaped pieces 30 30, the object of which will be explained hereinafter. The platen 9 has a smooth under surface which rolls upon the surface of the rollers 8 8. It has side strips 31, which may be attached by means of screws 32, which pass through slots in the said side strips and allow of a certain vertical adjustment of the latter, so that the top edges of these strips may be brought just in contact with the surface of the roller 19. At the ends of the table are strips 33 33, the top surfaces of which are flush with the surface of the platen 9. The inner edges of these strips are beveled, as shown, and are normally held in close contact with the edge of the recess in the table by means of springs 34, and at the ends of the strips are pins 35, which project through slots in the side plates 31.

In order to move the platen 9 under the roller 19 at the same speed at which the surface of the latter revolves, two steel cords or tapes 39 are wrapped around the ends of the roller, pass over idle pulleys 40 on the frame of the machine and backward to a cross-bar 41, which slides on the main frame of the machine and has at the center a pin 42, which bears against the end of the platen 9. To keep the cords 39 taut, a second cord 43 is continued back to the end of the frame and there attached to a weight 44, as shown, or to a spring or some equivalent device.

The central table 10 is supported when in its lower position on the roller-bearing 45 of the tripod 12 and on the adjustable bearings (shown as screws) 46, set normally at such a height that the top surface of said table is on a line with the top surface of the rollers 8 8, already described. Through the side ribs 47 of the said table are holes through which pass loosely the ends of journals or shafts 48 of rollers 49. The ends of the shafts 48 rest when the table is down in V-shaped notches 50 in two bars 51, which are adjusted to such a height by means of screws 52 that the top surfaces of the rollers 49 are then just above the surface of the table 10. When, therefore, the table is in this position and the platen 9 is moved forward upon it, it rolls easily upon these rollers; but as soon as the table 10 is lifted above this position, carrying the rollers 49 with it, the ends of the shafts 48 are lifted out of the notches in the bars 51, allowing the rollers to descend slightly and the platen 9 to settle down into contact with the table 10, it being held in proper relation thereto by means of the beveled side flanges 11 and also small bevel projections 53, running across the lower surface of the table at right angles to these side pieces. Any other suitable steadying devices may be used. Thus instead of the bevel side flanges 11 we may advantageously use a single beveled center strip, as shown at 54 in Fig. 7, the edges of the plate being then allowed to project over the table 10, as shown, and allowing better opportunity for attaching the side strips 31.

The tripod-head 12 has at the base of its fork a screw 55, which acts as a stop and can be so adjusted as to be in contact with the lower surface of the table 10 when the latter is level or can be run down to permit the table 10 to take an inclined position, as in Fig. 6. Through the lower plate of the box-shaped casting 6 projects a screw 56, which serves as a stop to hold the tripod-head and its attached table 10 at the proper height.

Connected with the cylinder 15 is a pipe 57, communicating with the valve-casing 58, by means of which air can be admitted or allowed to escape from the cylinder 15 by manipulating the valve by means of the valve-lever 59.

The roll 19, carrying with it in rotation the platen 9, is rotated by means of a crank 60 or equivalent device in the case of a small machine or by means of an electric or other motor geared thereto in the case of a larger one.

In operating the machine we proceed as follows: We first adjust the height of the roller 19 by shifting its bearings by means of the screws 18 to such a distance from the surface of the platen 9 as will produce a sheet of glass of the required thickness, the side strips 31 on the table being adjusted to such a height that they are just in contact with the lower surface of the roller, as already described. The platen 9 is run back to a position in which it is entirely from under the roller 19. Molten glass is then poured upon the end of the platen next to the roller, as in making ordinary plate-glass. The roller 19 is then rotated, carrying with it the platen 9 and spreading out the glass deposited thereon into a sheet of the required thickness. The roller 19 is rotated until the platen has passed entirely under it and has been pushed by means of the pin 42 on the bar 41 against its stop. It now rests upon the top of the table in proper position for the V-shaped projections on the latter to engage with the corresponding grooves in the platen. The valve-lever 59 is now depressed to admit air to the cylinder 15 and raise the head and the attached table toward the die 23. This forces the glass into the cavities of the die and brings the glass into contact with every portion of the said cavities, thus molding, shaping, and finishing the glass into prism form. In order that there may be intimate contact between the die and the glass within the cavities, we vent each of the cavities by causing it to communicate with the atmosphere. In the die which we have shown, where the prism-forming cavities extend across the face of the die in parallel position, the end of each cavity is formed with a hole H or is left open, thus providing the needed air-vent. At the same time with the descent of the upper die the wedge-shaped pieces 30 engage the pins 35 35 of the strips 33 as the table rises and forces the latter strips outward, as shown in Fig. 4, leaving openings 61, into which the cutters 29 descend, and indent or shear off the rough ends of the glass. After the glass has remained in contact with the upper die long enough to set the valve-lever 59 is released, allowing the air to escape from the cylinder 15 and the table to descend to its lowest position. The stop 62 is then turned, so as to allow the platen 9 to be drawn through to the end of the machine opposite that at which it is entered. The machine is so placed that the glass sheet may then be removed directly from this table by suitable means and placed in the annealing-oven. The platen 9 is then run back to its first position and is ready for the repetition of the operation. In making glass sheets in which the figure or corrugation thereon have projecting portions making less than a right angle with the general surface of the sheet it is necessary in order that the finished sheet may come away or "draw" from the die that the platen 9 and the top die 23 be tilted at such an angle that when the sheet is lifted vertically the said projecting portions of the figured surface will clear themselves from the die. This is easily accomplished without altering the general arrangement of the machine by simply adjusting the screw 55 downwardly to the amount desired and tilting the die-plate 22 and the attached die 23 to the required angle by means of the adjusting-screws 25. Then when the piston-head and attached tripod 12 are raised the first action is simply to tilt the table until the lower surface of the latter has come into contact with the top of the screw 55, and the whole is then raised bodily, as before, against the die-plate 23, figuring and finishing the surface, as just described. When the air is released from the cylinder, the head and the plate first fall together until the glass has cleared itself from the upper die 23, and then as the lower surface of the table comes in contact with the screws 46 the table resumes its horizontal position and can be drawn out at the rear of the machine, as before.

To recapitulate briefly the operation of this apparatus, we pour upon the platen 9 a gathering of molten glass, and while the same is freely plastic we pass the platen under the forming-roller 19, which distributes the glass and spreads it out into the form of a plate upon the platen 9. As the platen passes from under the roll it comes beneath the upper die 23 and then, the glass being still plastic, the platen and die are brought together and shape and finish the upper surface of the glass into the series of prisms desired to be formed to produce the finished article without further spreading the glass plate at this second operation substantially beyond the limits to which it was spread by the preliminary step. Inherent strain and tension of the glass are thus prevented. The plunger remains in contact with the glass a brief time, two or three seconds ordinarily will suffice, so as to chill the glass sufficiently to cause it to set and retain the prism-pattern. The plunger is then raised, and the glass-prism sheet is removed from the machine and annealed in the ordinary way in an annealing furnace or leer. Between the operation of distributing the glass into a flat mass and the forming of the prism-pattern thereon the glass sets sufficiently or becomes sufficiently solid to retain the shape into which it is formed without losing it by the running together of the hot glass or without burning the sharp projecting portions of the figured surface of the die.

We believe we are the first to make prism-glass by rolls and an upper die of the character above described, and we attain new and distinctive results thereby, being enabled to produce sheets of prism-glass of large size and of unstrained molecular structure.

Our improved apparatus is distinct from all prior machines in the use of a forming or molding die which does not operate merely to cut into the surface, but which acts to mold the upper body of the previously-rolled mass of glass, so as to destroy what would otherwise be a level surface and impart to the body of the material different transverse sectional form.

We claim—

1. Apparatus for making prism-glass comprising a spreading-table on which the glass is rolled, a roll, and an upper pressing-die having prism-form shaping-cavities, said cavities being provided with air-vents and means arranged to force said spreading-table and die toward one another said die being shaped to make pressing-contact of the surface of the said cavities with the entire surface of the glass beneath them; substantially as described.

2. In a machine for shaping vitreous material, a lower spreading-table for receiving the material, means for spreading the material thereon, an upper die, and means for superposing and bringing the spreading-table and die toward one another to compress the intervening material, and devices adapted to carry the spreading-table and die to an inclined position, and to support them in said position during the act of separation; substantially as described.

3. The combination with a forming-die and table, of means for setting them in an inclined position, and devices for supporting them in such position during the act of separation; substantially as described.

4. The combination of a longitudinally-movable spreading-platen, a table to receive the same, a reciprocating shaping-die, and means for carrying the die and table to and from each other; substantially as described.

5. The combination of a longitudinally-movable spreading-platen, a table to receive the same, an upper shaping-die, means for adjusting the die and table to different angles, and means for carrying them to and from each other; substantially as described.

6. The combination of a longitudinally-movable spreading-platen, a movable table to receive the same, a reciprocating shaping-die, yielding supports for said die, and means for carrying the table and die to and from each other; substantially as described.

7. The combination of a longitudinally-movable spreading-platen and supports upon which it can travel, a movable table in line with said supports, a die above said table, and means for carrying the die and table to and from each other; substantially as described.

8. The combination of the table 10 having beveled sided strips and a die with faces adapted to the sides of said strips; substantially as set forth.

9. The carrier 12 and table 10 in combination with a suspended die 23, the table pivoted to the carrier, and an adjustable stop 55; substantially as set forth.

10. The carrier 12, mechanism operating the same, and table 10, in combination with a suspended die 23, the table pivoted to the carrier, and an adjustable stop 55; substantially as set forth.

11. The combination of a vertically-moving table 10, rollers carried thereby and capable of a limited vertical movement, and supports for the roller journals arranged to hold the rollers in position projecting above the table when the latter is in its lower position; substantially as set forth.

12. The combination with the vertically-movable table 10, of rollers carried therewith normally projecting above the table, and means for depressing the roller when the table is lifted; substantially as set forth.

13. The combination with the lower sliding platen, upper suspended die, and vertically-movable table 10, of rollers carried therewith, normally projecting above the table, and means for depressing the rollers when the table is lifted; substantially as set forth.

14. The combination of an engine having a piston-rod and carrier 12 connected therewith, a table pivoted to said carrier, adjusting means and a suspended die 23; substantially as set forth.

15. The combination of the platen 9 having shearing edges and movable strips 33, and a die 23, cutters 29, and devices for moving out the strips as the cutters descend; substantially as set forth.

In testimony whereof we have hereunto set our hands.

DANIEL C. RIPLEY.
FRANK L. O. WADSWORTH.

Witnesses:
THOMAS W. BAKEWELL,
H. M. CORWIN.